(12) United States Patent
Hawley, III

(10) Patent No.: US 9,327,874 B2
(45) Date of Patent: May 3, 2016

(54) WATER COLLECTION PAN FOR APPLIANCES

(71) Applicant: Charles Burridge Hawley, III, Oak Island, NC (US)

(72) Inventor: Charles Burridge Hawley, III, Oak Island, NC (US)

(*) Notice: Subject to any disclaimer, the term of this patent is extended or adjusted under 35 U.S.C. 154(b) by 47 days.

(21) Appl. No.: 14/278,061

(22) Filed: May 15, 2014

(65) Prior Publication Data
US 2015/0330699 A1    Nov. 19, 2015

(51) Int. Cl.
| F25D 21/14 | (2006.01) |
| F16N 31/00 | (2006.01) |
| B65D 25/38 | (2006.01) |
| B65D 90/24 | (2006.01) |

(52) U.S. Cl.
CPC ........... B65D 25/38 (2013.01); B65D 90/24 (2013.01); F25D 21/14 (2013.01); *F16N 31/006* (2013.01); *F25D 2321/144* (2013.01); *F25D 2321/1442* (2013.01)

(58) Field of Classification Search
CPC ............... F25D 2321/1442; F25D 2321/144; F25D 21/14; F25D 2321/146; F16N 31/006; B65D 25/38; B65D 90/24; F24F 13/22
USPC ........................................................ 220/571
See application file for complete search history.

(56) References Cited

U.S. PATENT DOCUMENTS

| 1,034,340 | A |   | 7/1912 | Bishop |
| 3,304,950 | A | * | 2/1967 | Hubert ............... D06F 39/081 137/312 |
| 4,889,155 | A |   | 12/1989 | Trotter, Sr. |
| D337,154 | S |   | 7/1993 | Simpson |
| 5,429,236 | A | * | 7/1995 | Evans ............... B65D 19/0016 108/55.1 |
| 5,437,303 | A | * | 8/1995 | Johnson ............ D06F 39/081 137/312 |
| 5,452,739 | A | * | 9/1995 | Mustee ............... A47L 15/4212 137/312 |
| 5,478,625 | A | * | 12/1995 | Wright ................ F16N 31/006 180/69.1 |
| 5,598,594 | A | * | 2/1997 | Milliken ............... B08B 17/00 14/69.5 |
| D388,566 | S |   | 12/1997 | Reid et al. |
| 6,106,712 | A | * | 8/2000 | New ................... B01D 17/0208 141/98 |
| 6,120,876 | A | * | 9/2000 | Walton ................ F16N 31/006 180/69.1 |
| 6,718,788 | B1 |   | 4/2004 | Shuck |
| 2010/0243661 | A1 | * | 9/2010 | Upham ................ A47L 15/4212 220/571 |

* cited by examiner

*Primary Examiner* — Jeffrey Allen
*Assistant Examiner* — Jennifer Castriotta
(74) *Attorney, Agent, or Firm* — Harpman & Harpman

(57) ABSTRACT

A liquid containment device for use with refrigerators to prevent overflow and damage to flooring. The containment device allows for appliance elevation within and integral support and water collection pan. The detachable loading ramps provide for smoothly rolling the appliance up onto the integrated independent elevated level support surfaces within the water retainment pan.

5 Claims, 4 Drawing Sheets

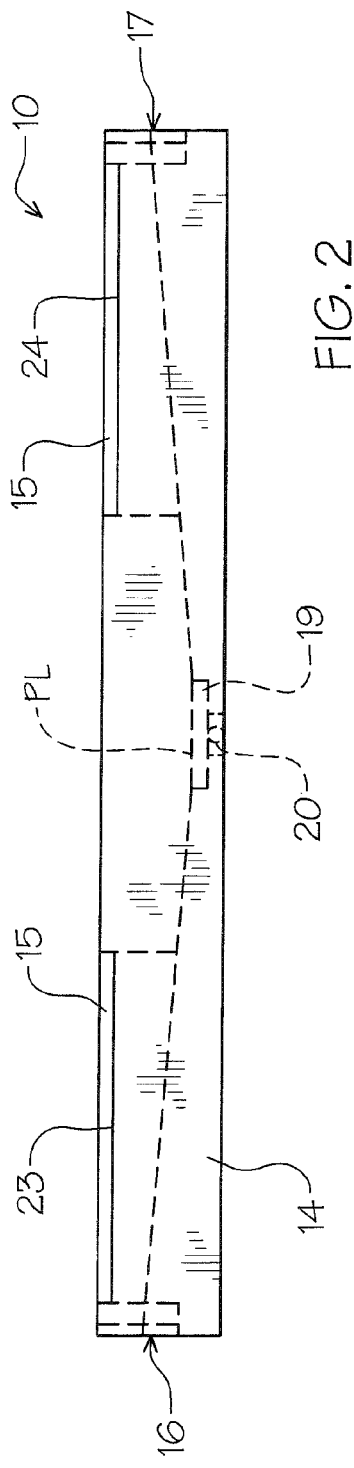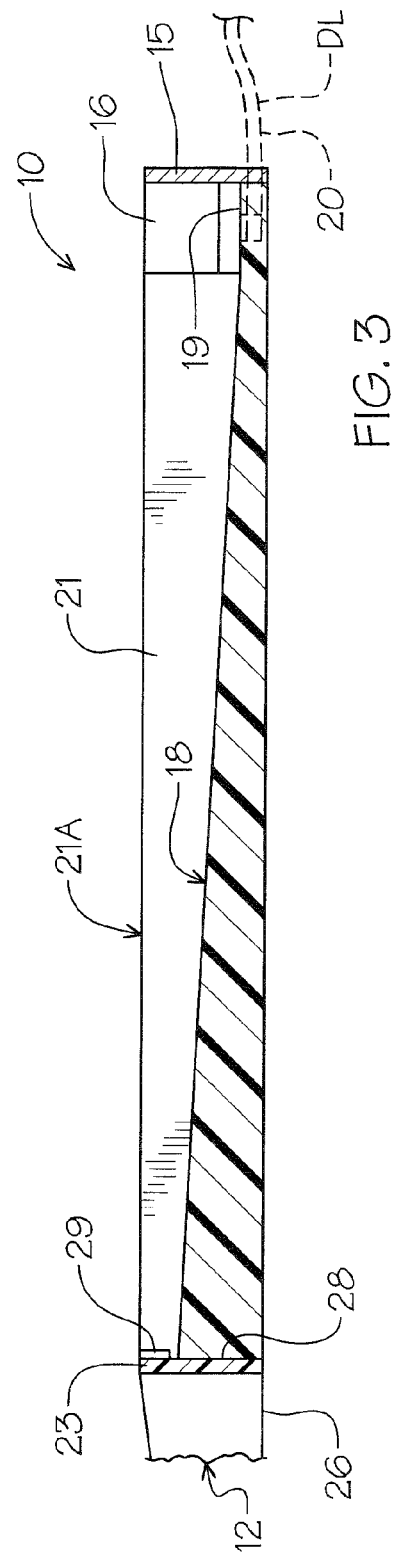

WATER COLLECTION PAN FOR APPLIANCES

This application claims the benefit of U.S. Provisional Application No. 61/828,326, filed May 29, 2013.

BACKGROUND OF THE INVENTION

1. Technical Field

This invention relates to drain and water containment safety pans placed under appliances that generate water output from defrosting and condensation and the like such as refrigerators.

2. Description of Prior Art

Prior art devices of this type have been heretofore directed to water overflow safety trays or pans that the appliance is placed. Such overflow safety trays typically have a drain line connected thereto extending to a drain assuring that no water damage will occur if the water is released from the appliance.

Examples of such safety drain pans can be seen in U.S. Pat. Nos. 1,034,340, 4,889,155 and 6,718,788. Additionally, design patents D337,154 and D388,566.

U.S. Pat. No. 1,034,340 discloses a drip pan under an ice box which is connected to a remote drain by a drain line extending there between.

U.S. Pat. No. 4,889,155 discloses a water collection mat for dishwashers having a flexible base with an upstanding perimeter rim and an inner surface incline towards a center opening therein connected to a flexible drain tube.

U.S. Pat. No. 6,718,788 claims a method for producing a drain pan in which an appliance can be placed.

Design Patent D337,154 discloses a design for a drain tray having an inclined interior to collect water to a central drain outlet.

Design Patent D388,566 shows a water catcher for an appliance having a water tray which is elevated on multiple adjustable legs.

SUMMARY OF THE INVENTION

A water collection and containment pan for appliances, specifically refrigerators that elevates the appliance within a water retention pan having upstanding sidewalls with an inclined interior base surface. Elevated elongated appliance receiving platforms extend from the interior surface of the pan providing support for an appliance positioned thereon in an elevated position. Auxiliary access loading ramps are provided to allow for rolling the appliance up and onto the platforms within the containment pan.

DESCRIPTION OF THE DRAWINGS

FIG. 2 is a front elevational view of the retainment support pan.

FIG. 3 is a section on lines 3-3 of FIG. 1.

DETAILED DESCRIPTION OF THE INVENTION

Figure 1:
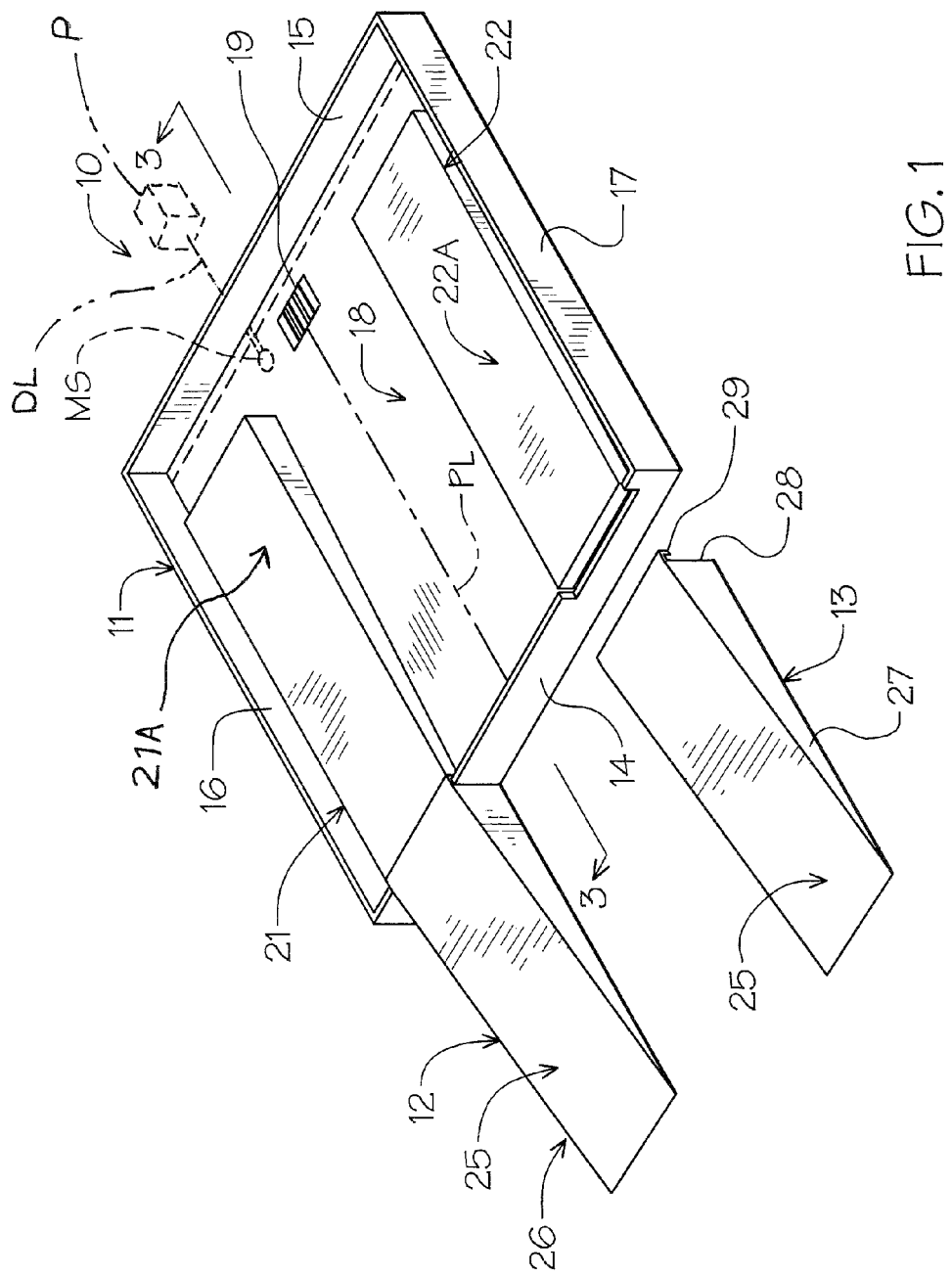
FIG. 1 is a perspective view of the collection pan of the invention with access ramps being positioned for use.
Figure 4:
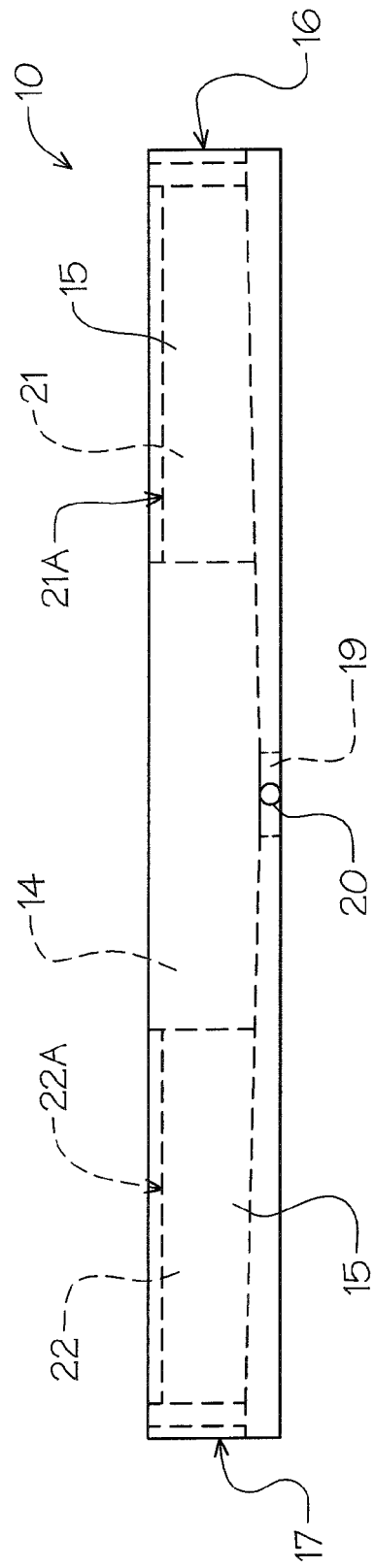
FIG. 4 is a rear elevational view of the retainment support pan.
Figure 5:
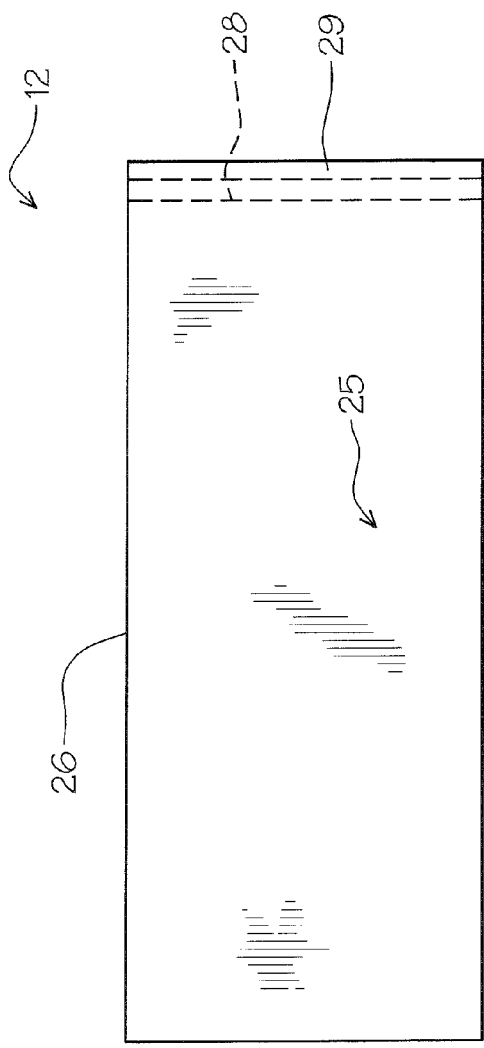
FIG. 5 is a top plan view of one of the access ramps.

A water containment pan 10 can be seen in FIG. 1 of the drawings having a pan portion 11 and multiple ramps 12 and 13 removably attached thereto as will be described in greater detail hereinafter.

The pan portion 11 has oppositely disposed front and rear walls 14 and 15 with interconnecting spaced parallel sidewalls 16 and 17. The wall pairs 14 and 15 and 16 and 17 are integral with a continuous interior surface 18 which has a dual incline pitch orientation extending from the front wall 14 downwardly to the rear wall 15 and correspondingly from the respective oppositely disposed sidewalls 16 and 17 inwardly towards a central area defined by a broken pitch line PL shown for representation purposes only.

An outlet drain 19 is formed within the interior surface 18 at a cross translateral point of the hereinbefore described dual pitch interior surface.

The drain 19 may be static having a gravity feed channel 20 extending outwardly therefrom through the rear wall 15 or active by having inclusion of an attached powered transfer pump P illustrated in dotted lines for an alternate illustration purpose only in FIG. 1 of the drawings.

A pair of spaced parallel elongated elevated platforms 21 and 22 extend integrally from the dual pitch interior surface 18 extending from adjacent the front wall 14 and in spaced relation to the respective rear wall 15.

Referring now to FIGS. 1 and 2 of the drawings, the front wall 14 has a pair of spaced elongated notches 23 and 24 therein which will provide for respective access ramps 12 and 13 selective engagement registration and stabilization thereto for loading and unloading the wheeled appliance thereon as will be described in greater detail hereinafter.

The platforms 21 and 22 orientation within the pan portion 11 and corresponding dual side to side and front to back internal interior surface pitch can clearly be seen in FIGS. 2 and 3 of the drawings assuring that any liquid leakage that is generated from the appliance such as will occur during normal operation inclusive of defrosting or cooling as would occur in a refrigerator will safely be caught and retained there within.

The appliance receiving platforms 21 and 22 have respective flat level upper surfaces 21A and 22B which are the same height as that of the respective perimeter walls 14-17 and are of a transverse width and parallel spacing to accommodate a variety of different appliance support wheeled configurations.

Figure 6:
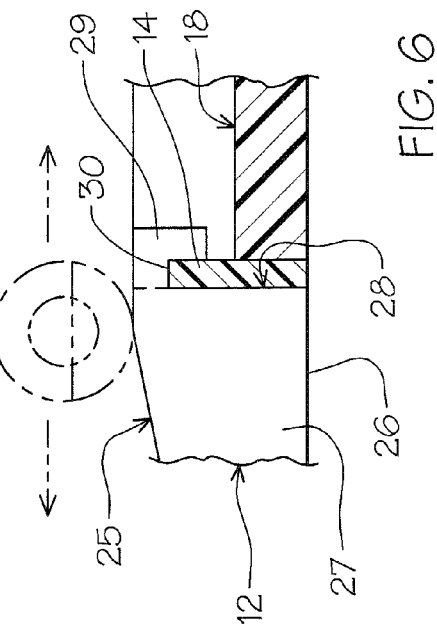
FIG. 6 is a partial sectional view on lines 6-6 of FIG. 5.

Referring now to FIGS. 1, 3, 5 and 6 of the drawings the access ramps 12 and 13 can be seen having an inclined tapered upper surface 25, an oppositely disposed flat ground engagement bottom 26 with respective vertical sides 27 and end 28. The end 28 has a wall engagement flange 29 extending in offset relation thereto forming a wall notch engagement channel 30 therein so as to be registerably engaged within and over the respective front wall notches 23 and 24, as best seen in FIG. 6 of the drawings.

In use, the appliance (refrigerator) indicated by wheel W is moved temporarily and the pan portion 11 is positioned in its place. A drain line DL shown in broken lines may be attached thereto, as noted. Additionally, an optional moisture sensor MS shown in broken lines can be placed within the pan portion to indicate the presence of moisture, if needed, in specific application purposes.

Each of the access ramps 12 and 13 are fitted over the corresponding aligned notches 23 and 24 temporarily securing them to the pan portion 11 forming a level abutting surface with the elevated platforms 21 and 22 respective flat upper surface 21A and 22A. This orientation of engagement of the respective ramps 12 and 13 over the front wall 14, notches 23 and 24 assures a smooth and barrier free pathway for the wheeled appliance (represented by the wheel W in broken lines) to be rolled up the respective ramp transition onto the upper surfaces of the platforms so as to be positioned.

Once positioned on the platforms 21 and 22, the ramps 12 and 13 are removed and stored for future use.

The appliance (refrigerator) indicated by wheel W is now safely positioned within the pan portion 11 providing a safe secure water containment pan 10 of the invention. The pan portion 11 and the respective identical access ramps 12 and 13 may be molded from synthetic resin or its equivalent and are to be of a structure sufficient in strength to support and maintain the elevated appliance in its position on the respective platforms.

It will thus be seen that a new and novel water collection pan for appliances has been illustrated and described and it will be apparent to those skilled in the art that various changes and modifications may be made thereto without departing from the spirit of the invention.

Therefore I claim:

1. A liquid retainment and support pan for use with an appliance or the like comprising, a pan portion and an access ramp portion, said pan portion dimensioned for underlying said appliance, the pan portion having a recessed inner surface and integral continuous upstanding perimeter walls extending therefrom, an upstanding appliance support platform extending from said recessed inner surface spaced within said pan portion, said support platform having a level solid continuous surface in planar relation with the top edges of said perimeter walls, said ramp portion comprises a ramp removable secured to one of said upstanding perimeter walls and wherein said pan portion's inner recessed surface is dual pitched for collection of liquid into an outlet drain therein.

2. The liquid retainment and support pan set forth in claim 1 wherein said support platform further comprises, a pair of spaced parallel upstanding elongated support platforms extending from said recessed inner surface in spaced relation to said perimeter sidewalls, for receiving said appliance thereon.

3. The liquid retainment and support pan set forth in claim 1 wherein one of said perimeter walls has at least one elongated notch therein in aligned for registration with said ramp.

4. The liquid retainment and support pan set forth in claim 1 wherein said outlet drain within said interior surface further comprises, a drain channel within said recessed inner surface interconnecting said drain and extending through an adjacent upstanding perimeter walls.

5. The liquid retainment and support pan set forth in claim 1 wherein said ramp portion further comprises, a pair of spaced parallel independent ramps selectively secured to notches in a perimeter wall of said pan portion in oppositely disposed relation to said outlet drain.

* * * * *